United States Patent
Mikan et al.

(10) Patent No.: US 9,037,665 B2
(45) Date of Patent: *May 19, 2015

(54) SPAM DETECTION BASED ON AN AGE OF A DECOY SUBSCRIBER NUMBER

(71) Applicant: AT&T Mobility II LLC, Atlanta, GA (US)

(72) Inventors: Jeffrey Mikan, Atlanta, GA (US); Justin McNamara, Dunwoody, GA (US); Fulvio Cenciarelli, Suwanee, GA (US); Anastasios L. Kafalas, Alpharetta, GA (US); John Ervin Lewis, Lawrenceville, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 83 days.

This patent is subject to a terminal disclaimer.

(21) Appl. No.: 13/890,378

(22) Filed: May 9, 2013

(65) Prior Publication Data

US 2013/0246548 A1    Sep. 19, 2013

Related U.S. Application Data

(63) Continuation of application No. 11/615,142, filed on Dec. 22, 2006, now Pat. No. 8,458,262.

(51) Int. Cl.
*G06F 15/16* (2006.01)
*H04L 12/58* (2006.01)
*H04W 88/18* (2009.01)

(52) U.S. Cl.
CPC .............. *H04L 51/12* (2013.01); *H04L 12/585* (2013.01); *H04L 12/5895* (2013.01); *H04L 51/38* (2013.01); *H04W 88/184* (2013.01)

(58) Field of Classification Search
CPC .............................. H04L 12/585; H04L 51/12
USPC ......................................................... 709/206
See application file for complete search history.

(56) References Cited

U.S. PATENT DOCUMENTS

| | | | |
|---|---|---|---|
| 5,416,833 A * | 5/1995 | Harper et al. | 379/201.05 |
| 6,052,709 A | 4/2000 | Paul | |
| 8,458,262 B2 * | 6/2013 | Mikan et al. | 709/206 |
| 2005/0041789 A1 | 2/2005 | Warren-Smith et al. | |
| 2005/0060417 A1 | 3/2005 | Rose | |
| 2005/0080856 A1 | 4/2005 | Kirsch | |
| 2005/0114453 A1 * | 5/2005 | Hardt | 709/206 |
| 2005/0141486 A1 * | 6/2005 | Gilchrist et al. | 370/352 |
| 2005/0246440 A1 * | 11/2005 | Yu | 709/225 |

(Continued)

FOREIGN PATENT DOCUMENTS

| | | |
|---|---|---|
| DE | 101 17 052 | 10/2002 |
| FR | 2 872 602 | 1/2006 |
| WO | WO 2005/055545 | 6/2005 |

*Primary Examiner* — Jeong S Park
(74) *Attorney, Agent, or Firm* — Baker & Hostetler LLP

(57) ABSTRACT

Methods and systems of filtering spam messages for cellular network subscribers are provided that may include receiving a message from a decoy subscriber number. The method and systems may further be adapted to determine whether the message at the decoy subscriber number may be spam. If the message at the decoy number tends to be spam, the message may be output to a filtering service for further analysis. In the final analysis if a message is determined to be spam, then new rules may be created and distributed to front end spam and/or virus engines to restrict such traffic from reaching subscribers.

20 Claims, 7 Drawing Sheets

(56) References Cited

U.S. PATENT DOCUMENTS

| | | |
|---|---|---|
| 2006/0101515 A1 | 5/2006 | Amoroso et al. |
| 2006/0168017 A1 | 7/2006 | Stern et al. |
| 2007/0116213 A1* | 5/2007 | Gruchala et al. ......... 379/100.01 |
| 2008/0155693 A1 | 6/2008 | Mikan et al. |

* cited by examiner

SPAM DETECTION BASED ON AN AGE OF A DECOY SUBSCRIBER NUMBER

CROSS REFERENCE TO RELATED APPLICATIONS

The instant application is a continuation application of, and claims priority to, U.S. patent application Ser. No. 11/615,142, filed Dec. 22, 2006. U.S. patent application Ser. No. 11/615,142 is hereby incorporated by reference in its entirety.

BACKGROUND

Short Message Service (SMS) is a typical service offered by most cellular service providers that permits the sending of short messages (also known as "text messages") between mobile phones, other handheld devices and even landline telephones. Today, text messaging continues to become increasingly popular among cell phone subscribers. Because of its popularity, text messaging has come under attack, much like email, by solicitors sending "spam" messages.

Spam, which is defined as bulk, unsolicited email, text messages and the like, has become a large problem in the wireless industry. Subscribers generally find spam to be highly irritating because of the inconvenience involved with having to review and delete messages for which they have no interest. In addition, many service plans charge per message or only allow for a certain number of text messages per month, and every message over that limit costs the subscriber a per-message fee. Cellular service providers typically absorb this fee for spam messages, because subscribers do not want to pay for a message they had no interest in receiving in the first place, and if forced to do so will likely switch service providers. Some subscribers even go so far as to have the messaging service disabled rather than deal with spam. In either situation, the cellular service provider loses a potential source of income.

To solve the epidemic of spam, email service providers typically set up "decoy mailboxes" to lure spam. If an email address—to which no account is assigned—receives an email message, the service provider can be fairly certain that the message is spam. Service providers then send these messages to a spam filtering company that compares the message to messages received from other service providers to accurately determine if the message is spam.

For cellular service providers it is impractical to establish a large number of decoy numbers because the numbers are a valuable commodity that are better used when they are providing a service to a paying customer. Thus, there is a need for decoy number system that may be used in a cellular system without tying up otherwise usable numbers. In addition, there is a need for detection mechanism that identifies potential spam messages that arrive at such decoy or other numbers.

SUMMARY

In view of the above shortcomings and drawbacks, methods and systems are provided that detect and filter spam messages. According to an example embodiment, a method of filtering spam messages for cellular network subscribers includes receiving a message from a decoy subscriber number. The method may further include determining whether the message at the decoy subscriber number may be spam. According to an example embodiment, if the message at the decoy number tends to be spam, the message may be output to a filtering service.

According to an example embodiment, a spam filter component for filtering unsolicited messages includes a first decoy module. The first decoy module may be adapted to receive one or more messages from a decoy subscriber number. The spam filter component further includes a spam library module. The spam library module may be adapted to store information for determining whether a message may be spam including one or more rules. The spam filter component may also include a spam processor component in operative communication with the first decoy module and the spam library module. According to an example embodiment, the spam processor component may compare the message received by the first decoy module with the rules in the spam library module. If the message received at the first decoy module includes information corresponding to the rules, the spam processor component may output the message as spam.

DETAILED DESCRIPTION

Figure 1:
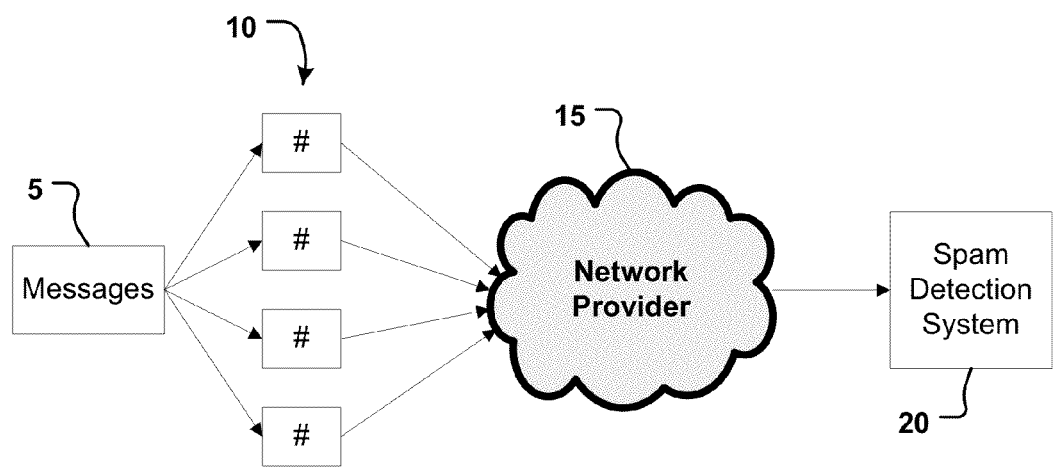
FIG. 1 illustrates an overview of the flow of messages in accordance with an embodiment.
Figure 3A:
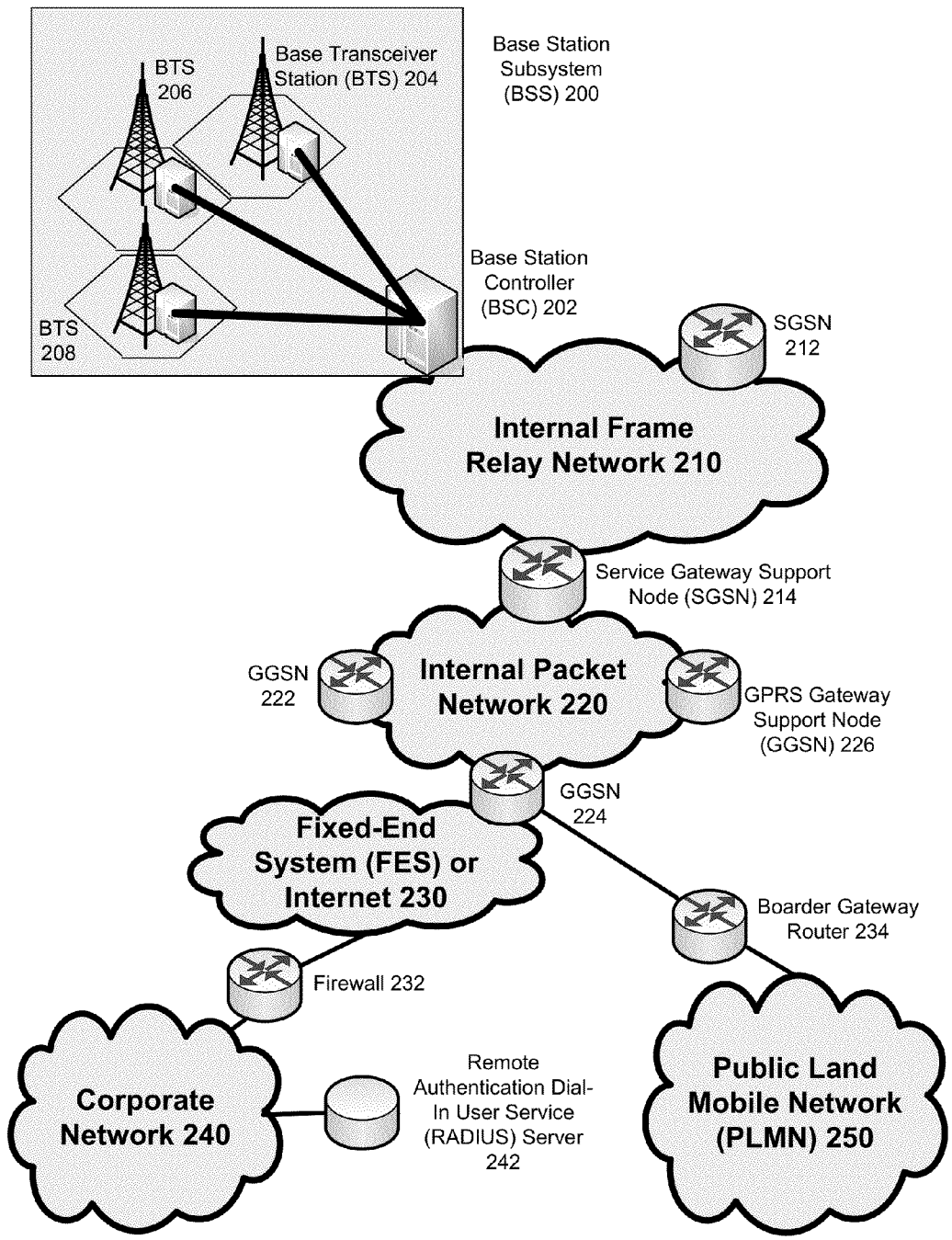
FIG. 3A illustrates an overview of a network environment in which aspects of an embodiment may be implemented.
Figure 3B:
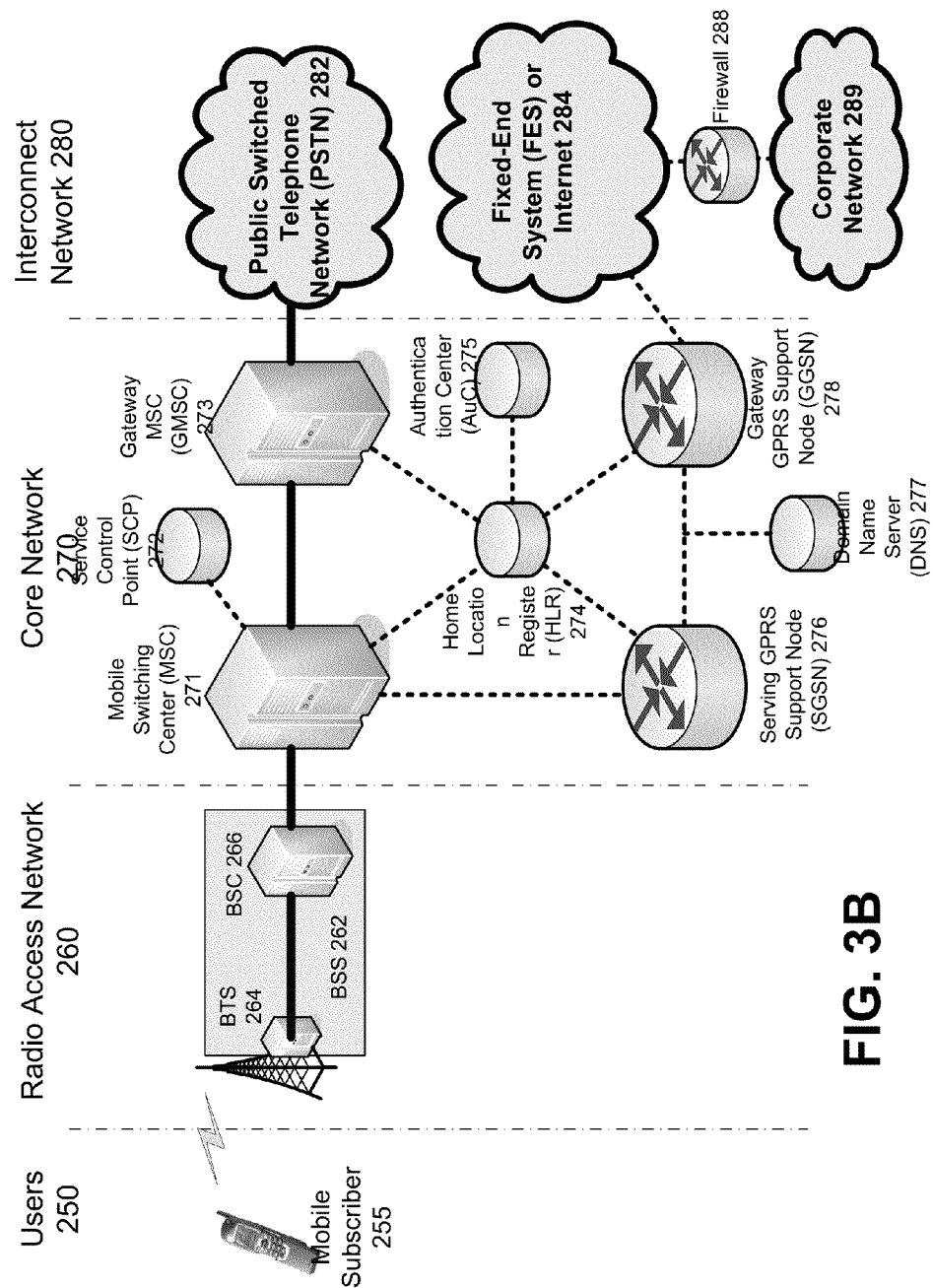
FIG. 3B illustrates a GPRS network architecture in which aspects of an embodiment may be implemented.
Figure 3C:
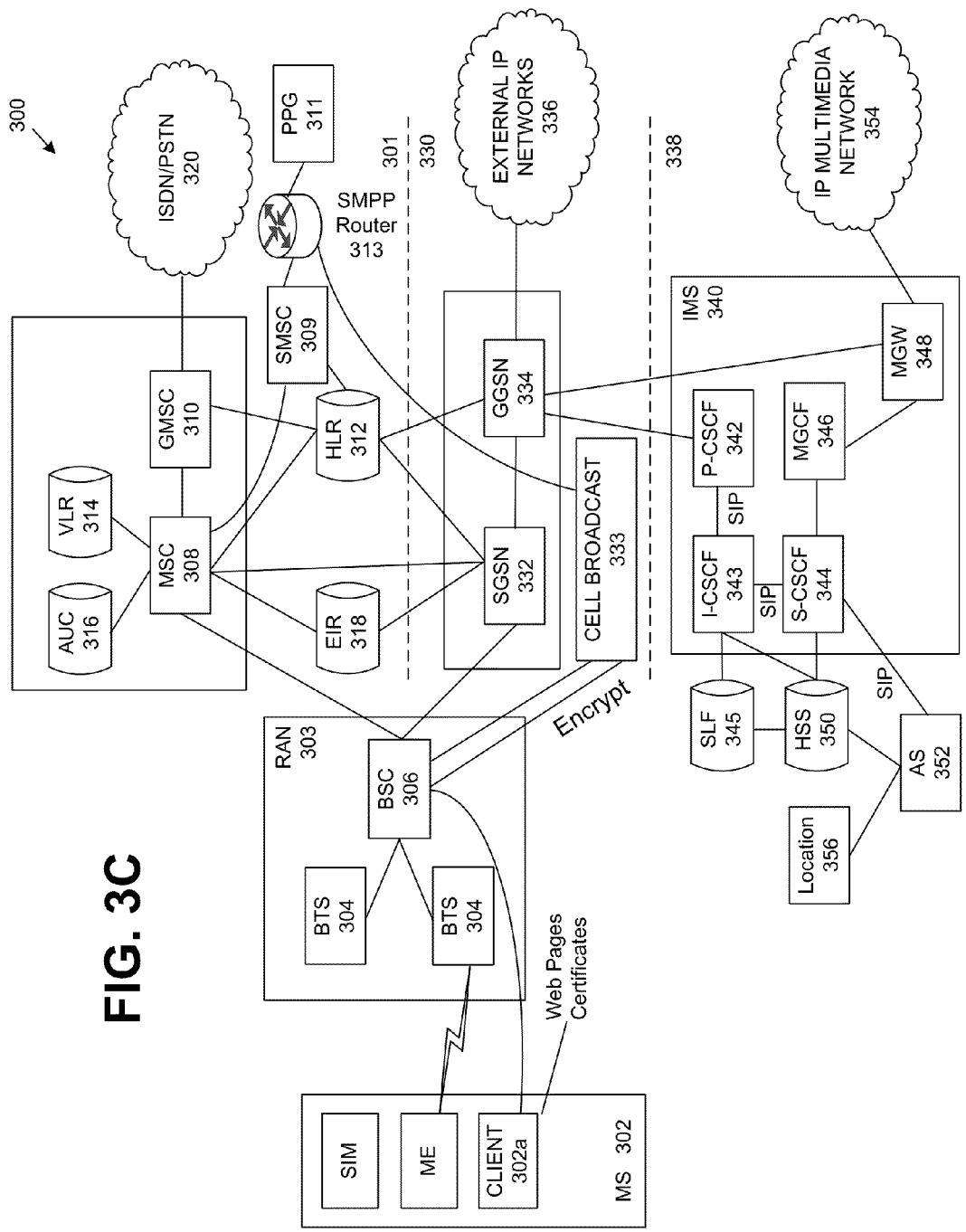
FIG. 3C illustrates an alternate block diagram of an example GSM/GPRS/IP multimedia network architecture in which aspects of an embodiment may be implemented.

FIG. 1 illustrates an overview of the flow of messages in accordance with the systems and methods of detecting and filtering spam. As show in FIG. 1, messages 5 may be received at one or more decoy subscriber numbers 10. Messages 5 may include, for example, text messages including short messages, email messages, instant messages, multimedia messages, pictures, graphics, and/or video messages. Decoy subscriber numbers 10 may include the cellular phone number of an inactive account that has been transferred or cancelled or has not yet been assigned to a subscriber. Typically, transferred or cancelled numbers may be held for a 30 day quiet period before being re-assigned to a new account holder. Decoy subscriber numbers 10 may be in communication with network provider 15. Network provider 15 may include the example network and operating environment as shown in FIGS. 3A-3C and described below, for example. Network provider 15 may be in communication with spam detection system 20. Spam detection system 20 may be external to the network provider, such that, network provider 15 may send messages 5 that were received at decoy subscriber numbers 10 to spam detection system 20 via network provider 15. Alternatively, spam detection system 20 may be a component operated and housed within network provider 15 that receives messages 5 from decoy subscriber numbers 10. Spam detection system 20 may analyze messages 5 at decoy subscriber numbers 10 to determine whether messages 5 may be spam or whether messages 5 may be solicited or requested by a subscriber.

Figure 2A:
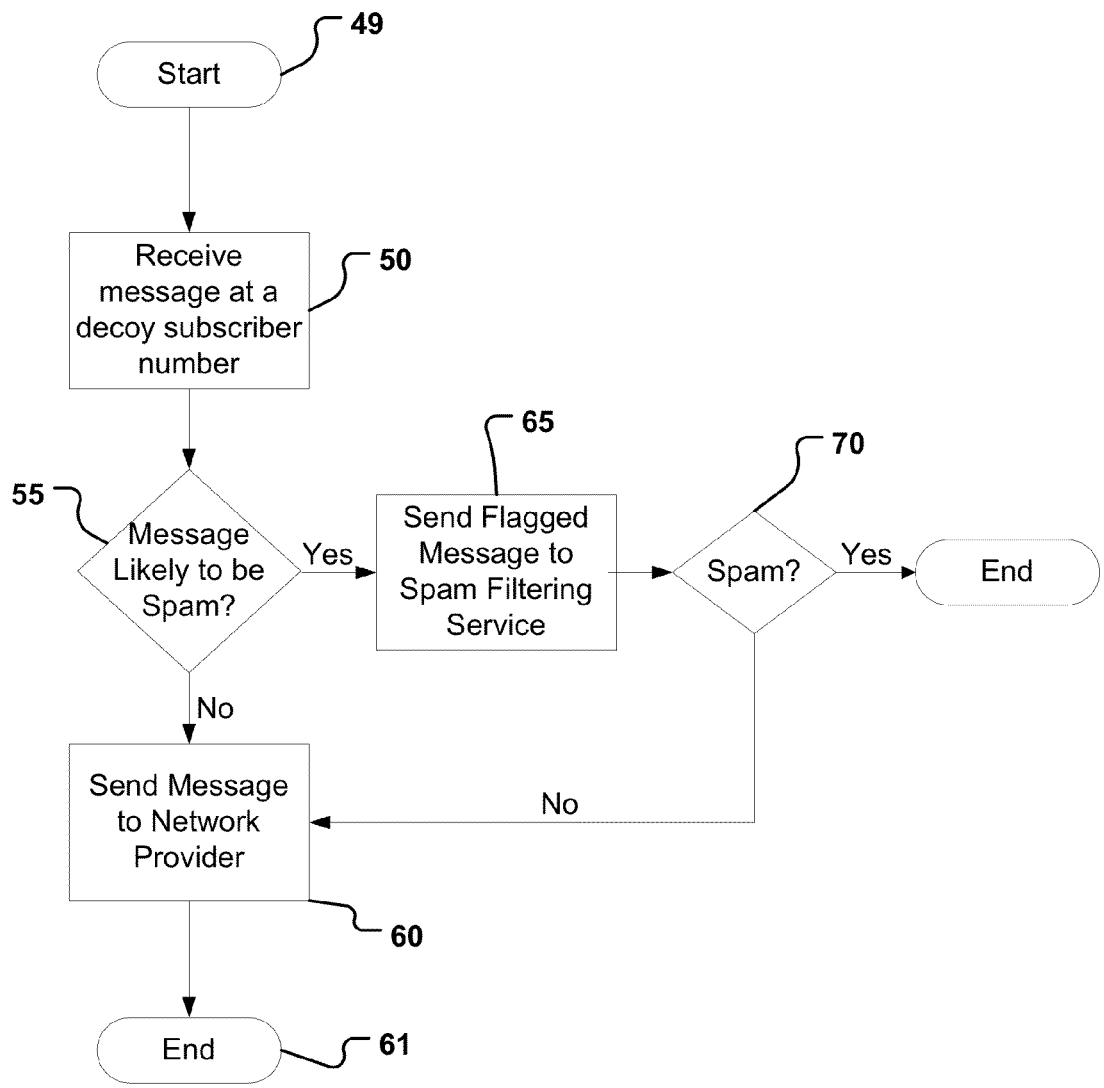
FIG. 2A is a flow chart illustrating an example method of filtering and detecting spam messages in accordance with an embodiment.

FIG. 2A is a flow chart illustrating an example method of filtering and detecting spam messages according to one embodiment. As shown in FIG. 2A, at 50, a message may be received at a decoy subscriber number. The message may include, for example, text messages including short messages, email messages, instant messages, multimedia messages, pictures, graphics, and/or video messages. The messages may be routed to the decoy subscriber number via the network provider's internet or intercarrier email gateway. Additionally, the decoy subscriber numbers may include the cellular phone number of a previously active account that has been transferred or cancelled or has not yet been assigned to a subscriber.

At 55, the message received at the decoy subscriber number may undergo an initial spam analysis to determine whether the message received at the decoy subscriber number may likely be spam. The initial spam analysis may include, for example, comparing the received message to messages at other decoy numbers to determine whether the same message is being sent to numerous, unrelated numbers indicating a high likelihood of spam. Additionally, the initial spam analysis may include, for example, comparing the message to pre-defined spam criteria that may include, but is not limited to, deciding whether the volume of messages from the sender is greater than a threshold limit, deciding whether there is a sudden change in the subscriber's usage, deciding whether the origin of the message is inconsistent with the subscriber's prior use and the like. In the initial spam analysis, the message may also be compared to information stored in a spam library that may include various information such as, for example, sender identification data, decoy message mailbox ages, or keywords in messages that may have been flagged previously as present in spam. If the message is determined to have a likelihood of being spam, the message may be flagged during the initial spam analysis at 55. The initial spam analysis may also use the age of the decoy mailbox as a factor in deciding whether a message received at that mailbox is spam. For example, the older the mailbox, the more likely it becomes the message received is spam. But, during the first week after the original subscriber vacates the address due to canceling of service or number change, the carrier may return an invalid recipient to the sender so that automated systems that provide alerts, will know to turn off alert messages to the mail address. In addition to an initial spam analysis, other electronic message processes such as scanning for potential viruses and other malicious software may be conducted as well.

If, at 55, the message at the decoy subscriber number tends to be spam, the flagged message may sent to a spam filtering service at 65. The spam filtering service may then analyze the flagged message more thoroughly to determine whether it may be spam. For example, a fingerprint may be made for each spam message. In one embodiment, the fingerprint may include, for example, a string produced using a hashing function that may receive the message as its input. If at least one of the fingerprints matches a new message received by the spam filtering service, the new message may also be considered as spam. Additionally, the spam filtering service may run the message through a more rigorous spam and virus testing service such as a human examination. At 70, if the spam filtering service decides that the flagged message may be spam, the spam filtering service may send information (e.g. the phone number of the flagged message) back to 55. This information may be used at 55 to determine whether subsequent messages received at the subscriber decoy number may be spam. Additionally, at 70, if the spam filtering service decides the flagged message may be spam, the message may be discarded by the spam filtering service. At 70, if the spam filtering service decides the flagged message may not be spam, the spam filtering service may send the message to a network provider at 60.

If, at 55, the message at the decoy number tends to be solicited by a subscriber, the message may be sent to a network provider at 60. The network provider may then route the message to the appropriate subscriber. Additionally, a message fingerprint may be made of a message that was determined to be solicited such that future messages received at the decoy mailbox may be tested using that message's fingerprint.

Figure 2B:
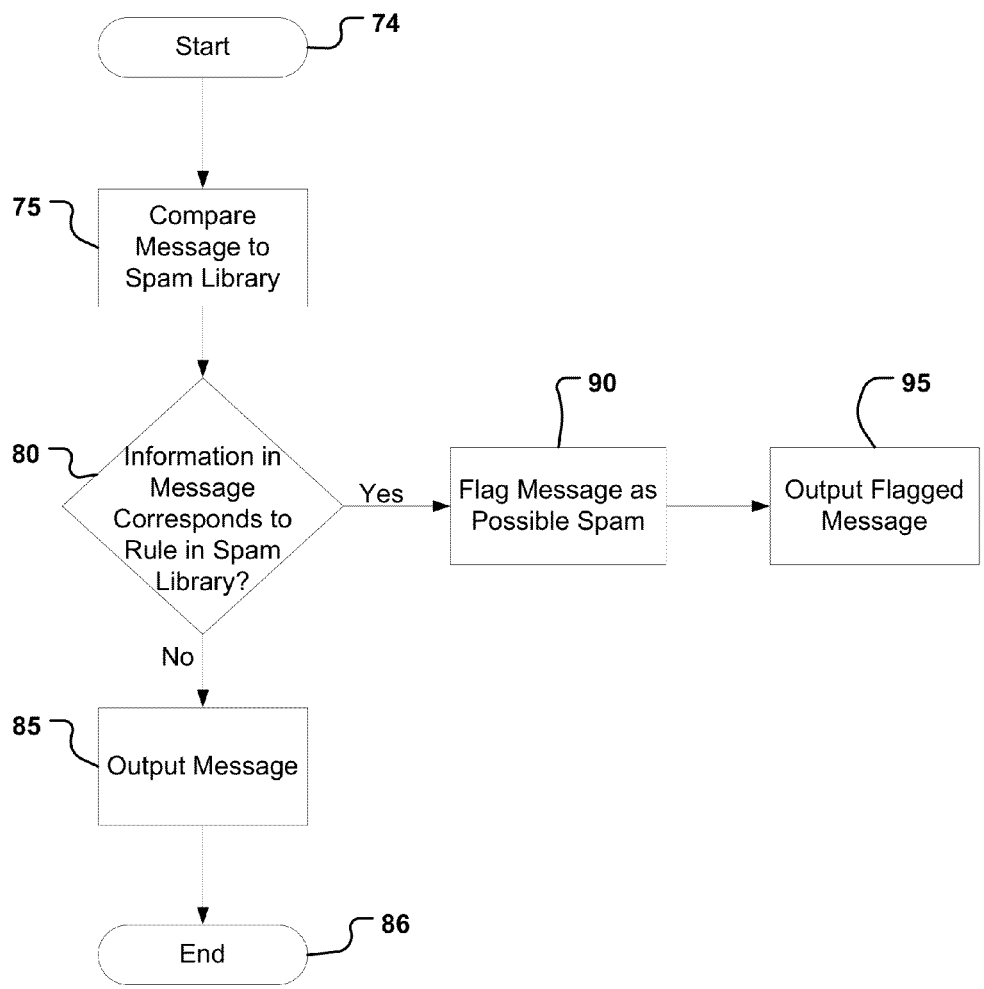
FIG. 2B is a flow chart further illustrating an example method of detecting spam messages according to an embodiment.

FIG. 2B is a flow chart further illustrating an example method of detecting spam messages. FIG. 2B may depict one embodiment of determining whether the message received at the decoy subscriber number may be spam, as depicted at 55 in FIG. 2A. As shown in FIG. 2B, at 75, a comparison may be made between information in a message received at a decoy subscriber and information in a spam library. In an embodiment, the spam library may include one or more rules. The rules may include, for example, information regarding messages at other decoy numbers. The rules may further include spam criteria that enables, for example, a decision regarding whether the volume of messages from the sender is greater than a threshold limit, a decision regarding whether there is a sudden change in the subscriber's usage, or a decision regarding whether the origin of the message is inconsistent with the subscriber's prior use. The rules may also include information such as, for example, sender identification data or keywords in messages that have been flagged previously as spam.

At 80, if information in the message corresponds to one or more rules stored in the spam library, the message may be flagged as possible spam at 90. Then, at 95, the flagged message may be output, for example, to a spam filtering service or to a network provider.

At 80, if information in the message does not correspond to the rules that may be stored in the spam library, the message may be output to a network provider, for example, at 85.

Figure 2C:
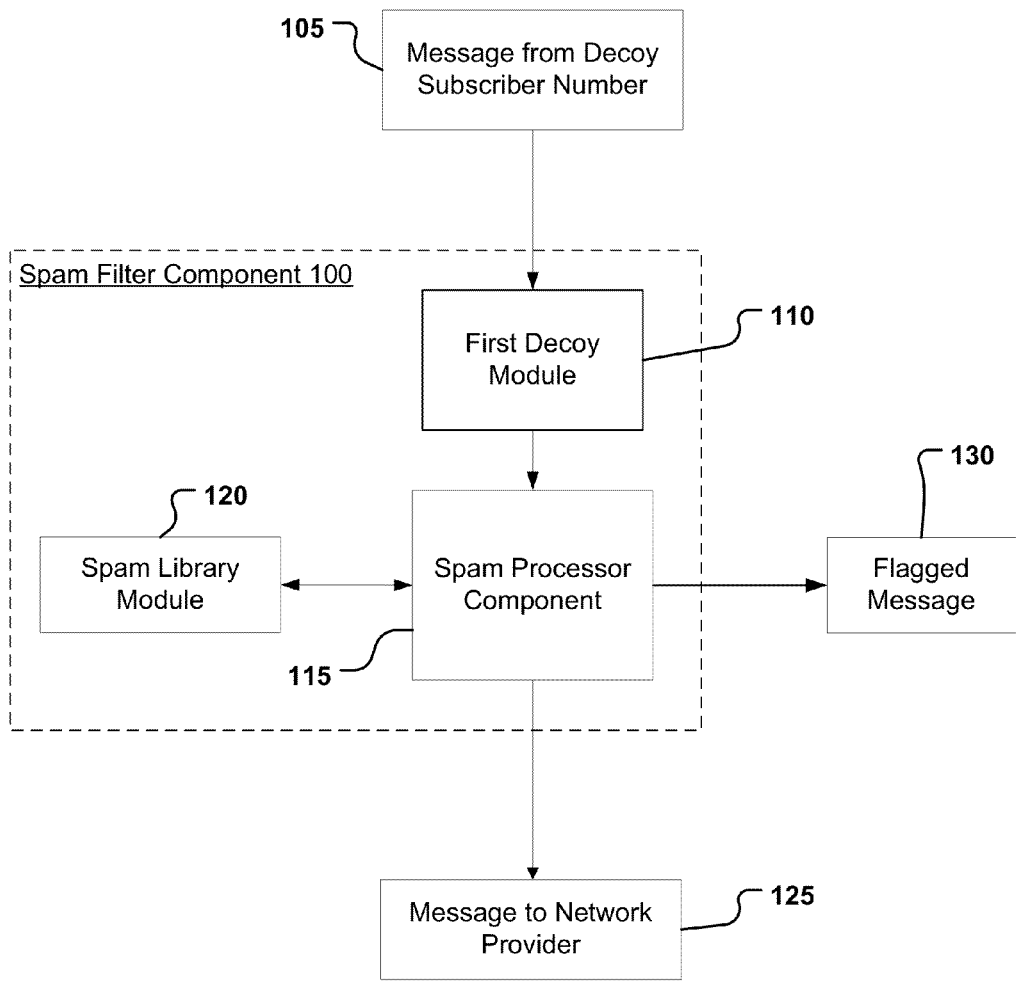
FIG. 2C illustrates an example embodiment of a spam filtering system.

FIG. 2C illustrates spam filter component 100 for filtering spam messages on a cellular network. Spam filter component 100 may include first decoy module 110. First decoy module 110 may store information contained in messages 105 received from decoy subscriber number. First decoy module 110 may include, for example, RAM memory chips or hardware designed to store data. First decoy module 110 may be in operative communication with a decoy subscriber number and may receive one or more messages 105 from the decoy subscriber number. Messages 105 from the decoy subscriber number may include, for example, text messages including short messages, email messages, instant messages, multimedia messages, pictures, graphics, and/or video messages. Additionally, the decoy subscriber number may include the cellular phone number of an inactive account that has been transferred or cancelled or has not yet been assigned to a subscriber. Typically, transferred or cancelled numbers are held for a 30 day quiet period before being re-assigned to a new account holder.

Spam filter component 100 may further include spam library module 120 adapted to store information for determining whether a message may be spam. Spam library module 120 may include, for example, RAM memory chips or hardware designed to store data. Spam library module 120 may include one or more rules such as, for example, information from messages at other decoy numbers. The rules may further include spam criteria that enables, for example, a decision regarding whether the volume of messages from the sender is greater than a threshold limit, a decision regarding whether there is a sudden change in the subscriber's usage, or a decision regarding whether the origin of the message is inconsistent with the subscriber's prior use. The rules may also include information such as, for example, sender identification data, the age of the decoy mailbox, or keywords in messages that have been flagged previously as spam. Spam library module 120 may be in operative communication with a spam filtering system, such that, the spam filtering system may update the rules stored in spam library module 120 using information in messages it may have previously determined as spam.

Spam filter component 100 further comprises spam processor component 115. Spam processor component 115 may be in operative communication with first decoy module 110 and spam library module 120 as shown in FIG. 2C. Spam processor component 115 may include, for example, a standard processor, a specialized processor, or the like. Spam processor component 115 may engage in an initial spam analysis by comparing information from the message stored in first decoy module 110 with the rules stored in spam library module 120. If spam processor component 115 determines the message includes information corresponding to the rules, spam processor component 115 may flag the message as spam 130. If spam processor component 115 instead determines the message to not be spam, the original message may be sent to network provider 125.

Spam filter component 100 may be implemented using a variety of techniques and hardware components, including but not limited to, servers, databases, microchips, storage devices, processors, or programmed modules. Furthermore, the spam filtering system may be implemented locally on the mobile phone or remotely using the network provider, or in some combination thereof. Additionally, spam filter component 100 may provide other electronic message processes such as scanning for potential viruses and other malicious software.

Example Network and Operating Environments

The following description sets forth some example telephony radio networks and non-limiting operating environments in which a FIG. 1-FIG. 2C according to an embodiment may be used. The below-described operating environments should be considered non-exhaustive, however, and thus the below-described network architecture merely shows an example network architecture in which aspects of various embodiments may be incorporated. One can appreciate, however, that aspects of an embodiment may be incorporated into now existing or future alternative architectures for communication networks.

The global system for mobile communication ("GSM") is one of the most widely-used wireless access systems in today's fast growing communication systems. GSM provides circuit-switched data services to subscribers, such as mobile telephone or computer users, for example. General Packet Radio Service ("GPRS"), which is an extension to GSM technology, introduces packet switching to GSM networks. GPRS uses a packet-based wireless communication technology to transfer high and low speed data and signaling in an efficient manner. GPRS optimizes the use of network and radio resources, thus enabling the cost effective and efficient use of GSM network resources for packet mode applications. For purposes of explanation, various embodiments are described herein in connection with GSM. The references to GSM are not exclusive, however, as it should be appreciated that embodiments may be implemented in connection with any type of wireless access system such as, for example, CDMA or the like.

As may be appreciated, the example GSM/GPRS environment and services described herein can also be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000 3x"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that shall become available in time. In this regard, the techniques of the various embodiments discussed below may be applied independently of the method of data transport, and does not depend on any particular network architecture, or underlying protocols.

FIG. 3A depicts an overall block diagram of an example packet-based mobile cellular network environment, such as a GPRS network, in which aspects of an embodiment may be practiced. In such an environment, there may be any number of subsystems that implement the functionality of the environment such as, for example, a plurality of Base Station Subsystems ("BSS") 200 (only one is shown in FIG. 3A), each of which comprises a Base Station Controller ("BSC") 202 serving a plurality of Base Transceiver Stations ("BTS") such as, for example, BTSs 204, 206 and 208. BTSs 204, 206, 208, etc., are the access points where users of packet-based mobile devices become connected to the wireless network. In one embodiment, the packet traffic originating from user devices is transported over the air interface to BTS 208, and from BTS 208 to BSC 202. Base station subsystems, such as BSS 200, may be a part of internal frame relay network 210 that may include Service GPRS Support Nodes ("SGSN") such as SGSN 212 and 214. Each SGSN 212, 214, etc. is in turn connected to internal packet network 220 through which SGSN 212, 214, etc. can route data packets to and from a plurality of gateway GPRS support nodes (GGSN) 222, 224, 226, etc. As illustrated, SGSN 214 and GGSNs 222, 224 and 226 are part of internal packet network 220. Gateway GPRS serving nodes 222, 224 and 226 may provide an interface to external Internet Protocol ("IP") networks such as Public Land Mobile Network ("PLMN") 250, corporate intranets 240, Fixed-End System ("FES"), the public Internet 230 or the like. As illustrated, subscriber corporate network 240 may be connected to GGSN 224 via firewall 232; and PLMN 250 may be connected to GGSN 224 via boarder gateway router 234. Remote Authentication Dial-In User Service ("RADIUS") server 242 may be used for caller authentication when a user of a mobile cellular device calls corporate network 240, for example.

Generally, there can be four different cell sizes in a GSM network—macro, micro, pico and umbrella cells. The coverage area of each cell is different in different environments. Macro cells may be regarded as cells where the base station antenna is installed in a mast or a building above average roof top level. Micro cells are cells whose antenna height is under average roof top level; they are typically used in urban areas. Pico cells are small cells having a diameter is a few dozen meters; they are mainly used indoors. On the other hand, umbrella cells are used to cover shadowed regions of smaller cells and fill in gaps in coverage between those cells.

FIG. 3B illustrates the architecture of a typical GPRS network as segmented into four groups: users 250, radio access network 260, core network 270 and interconnect network 280. Users 250 comprise a plurality of end users (though only mobile subscriber 255 is shown in FIG. 7B). Radio access network 260 comprises a plurality of base station subsystems such as BSSs 262, which include BTSs 264 and BSCs 266. Core network 270 comprises a host of various network elements. As illustrated here, core network 270 may comprise Mobile Switching Center ("MSC") 271, Service Control Point ("SCP") 272, gateway MSC 273, SGSN 276, Home Location Register ("HLR") 274, Authentication Center ("AuC") 275, Domain Name Server ("DNS") 277 and GGSN 278. Interconnect network 280 also comprises a host of various networks and other network elements. As illustrated in FIG. 3B, interconnect network 280 comprises Public Switched Telephone Network ("PSTN") 282, Fixed-End System ("FES") or Internet 284, firewall 288 and Corporate Network 289.

A mobile switching center may be connected to a large number of base station controllers. At MSC 271, for example, depending on the type of traffic, the traffic may be separated such that voice may be sent to Public Switched Telephone Network ("PSTN") 282 through Gateway MSC ("GMSC") 273, and/or data may be sent to SGSN 276, which then sends the data traffic to GGSN 278 for further forwarding.

When MSC 271 receives call traffic, for example, from BSC 266, it may send a query to a database hosted by SCP 272. The SCP 272 processes the request and issues a response to MSC 271 so that it may continue call processing as appropriate.

HLR 274 is a centralized database for users to register to the GPRS network. HLR 274 stores static information about the subscribers such as the International Mobile Subscriber Identity ("IMSI"), subscribed services, and a key for authenticating the subscriber. HLR 274 also stores dynamic subscriber information such as the current location of the mobile subscriber. Associated with HLR 274 may be AuC 275. AuC 275 is a database that contains the algorithms for authenticating subscribers and includes the associated keys for encryption to safeguard the user input for authentication.

In the following, depending on context, the term "mobile subscriber" may refer to either the end user or to the actual portable device used by an end user of the mobile cellular service. When a mobile subscriber turns on his or her mobile device, the mobile device goes through an attach process by which the mobile device attaches to an SGSN of the GPRS network. Referring now to FIG. 3B, when mobile subscriber 255 initiates the attach process by turning on the network capabilities of the mobile device, an attach request is sent by mobile subscriber 255 to SGSN 276. The SGSN 276 queries another SGSN, to which mobile subscriber 255 was attached before, for the identity of mobile subscriber 255. Upon receiving the identity of mobile subscriber 255 from the other SGSN, SGSN 276 requests more information from mobile subscriber 255. This information is used to authenticate mobile subscriber 255 to SGSN 276 by HLR 274. Once verified, SGSN 276 sends a location update to HLR 274 indicating the change of location to a new SGSN, in this case SGSN 276. HLR 274 notifies the old SGSN, to which mobile subscriber 255 was attached, to cancel the location process for mobile subscriber 255. HLR 274 then notifies SGSN 276 that the location update has been performed. At this time, SGSN 276 sends an Attach Accept message to mobile subscriber 255, which in turn sends an Attach Complete message to SGSN 276.

After attaching itself with the network, mobile subscriber 255 then goes through the authentication process. In the authentication process, SGSN 276 sends the authentication information to HLR 274, which sends information back to SGSN 276 based on the user profile that was part of the user's initial setup. SGSN 276 then sends a request for authentication and ciphering to mobile subscriber 255. Mobile subscriber 255 uses an algorithm to send the user identification (ID) and password to SGSN 276. SGSN 276 uses the same algorithm and compares the result. If a match occurs, SGSN 276 authenticates mobile subscriber 255.

Next, mobile subscriber 255 establishes a user session with the destination network, corporate network 289, by going through a Packet Data Protocol ("PDP") activation process. Briefly, in the process, mobile subscriber 255 requests access to the Access Point Name ("APN"), for example, UPS.com (e.g., which can be corporate network 279) and SGSN 276 receives the activation request from mobile subscriber 255. SGSN 276 then initiates a Domain Name Service ("DNS") query to learn which GGSN node has access to the UPS.com APN. The DNS query is sent to the DNS server within the core network 270, such as DNS 277, which is provisioned to map to one or more GGSN nodes in the core network 270. Based on the APN, the mapped GGSN 278 can access the requested corporate network 279. The SGSN 276 then sends to GGSN 278 a Create Packet Data Protocol ("PDP") Context Request message that contains necessary information. The GGSN 278 sends a Create PDP Context Response message to SGSN 276, which then sends an Activate PDP Context Accept message to mobile subscriber 255.

Once activated, data packets of the call made by mobile subscriber 255 can then go through radio access network 260, core network 270, and interconnect network 280, in particular fixed-end system or Internet 284 and firewall 288, to reach corporate network 289.

Thus, network elements that may implicate the functionality of the service delivery based on real-time performance requirement(s) in accordance with an embodiment may include but are not limited to Gateway GPRS Support Node tables, Fixed End System router tables, firewall systems, VPN tunnels and any number of other network elements as required by the particular digital network.

FIG. 3C shows another example block diagram view of a GSM/GPRS/IP multimedia network architecture 300 in which the apparatus and methods for transferring multimedia content between receiving devices of the below-discussed embodiments may be incorporated. As illustrated, architecture 300 of FIG. 3C includes GSM core network 301, GPRS network 330 and IP multimedia network 338. GSM core network 301 includes Mobile Station (MS) 302, at least one Base Transceiver Station (BTS) 304 and Base Station Controller (BSC) 306. MS 302 is physical equipment or Mobile Equipment (ME), such as a mobile phone or a laptop computer that is used by mobile subscribers, with a Subscriber identity Module (SIM). The SIM includes an International Mobile Subscriber Identity (IMSI), which is a unique identifier of a subscriber. BTS 304 is physical equipment, such as a radio tower, that enables a radio interface to communicate with the MS. Each BTS may serve more than one MS. BSC 306 manages radio resources, including the BTS. The BSC may be connected to several BTSs. The BSC and BTS components, in combination, are generally referred to as a base station (BSS) or radio access network (RAN) 303.

GSM core network 301 also includes Mobile Switching Center (MSC) 308, Gateway Mobile Switching Center (GMSC) 310, Home Location Register (HLR) 312, Visitor Location Register (VLR) 314, Authentication Center (AuC) 318 and Equipment Identity Register (EIR) 316. MSC 308 performs a switching function for the network. The MSC also performs other functions, such as registration, authentication, location updating, handovers and call routing. GMSC 310 provides a gateway between the GSM network and other networks, such as an Integrated Services Digital Network (ISDN) or Public Switched Telephone Networks (PSTNs)

320. In other words, GMSC 310 provides interworking functionality with external networks.

HLR 312 is a database that contains administrative information regarding each subscriber registered in a corresponding GSM network. HLR 312 also contains the current location of each MS. VLR 314 is a database that contains selected administrative information from HLR 312. The VLR contains information necessary for call control and provision of subscribed services for each MS currently located in a geographical area controlled by the VLR. HLR 312 and VLR 314, together with MSC 308, provide the call routing and roaming capabilities of GSM. AuC 316 provides the parameters needed for authentication and encryption functions. Such parameters allow verification of a subscriber's identity. EIR 318 stores security-sensitive information about the mobile equipment.

Short Message Service Center (SMSC) 309 allows one-to-one Short Message Service (SMS) messages to be sent to/from MS 302. Push Proxy Gateway (PPG) 311 is used to "push" (i.e., send without a synchronous request) content to MS 102. PPG 311 acts as a proxy between wired and wireless networks to facilitate pushing of data to MS 302. Short Message Peer to Peer (SMPP) protocol router 313 is provided to convert SMS-based SMPP messages to cell broadcast messages. SMPP is a protocol for exchanging SMS messages between SMS peer entities such as short message service centers. It is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. MS 302 sends a location update including its current location information to the MSC/VLR, via BTS 304 and BSC 306. The location information is then sent to the MS's HLR. The HLR is updated with the location information received from the MSC/VLR. The location update also is performed when the MS moves to a new location area. Typically, the location update is periodically performed to update the database as location updating events occur.

GPRS network 330 is logically implemented on the GSM core network architecture by introducing two packet-switching network nodes, a serving GPRS support node (SGSN) 332, a cell broadcast and a Gateway GPRS support node (GGSN) 334. SGSN 332 is at the same hierarchical level as MSC 308 in the GSM network. The SGSN controls the connection between the GPRS network and MS 302. The SGSN also keeps track of individual MS's locations and security functions and access controls.

Cell Broadcast Center (CBC) 333 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

GGSN 334 provides a gateway between the GPRS network and a public packet network (PDN) or other IP networks 336. That is, the GGSN provides interworking functionality with external networks, and sets up a logical link to the MS through the SGSN. When packet-switched data leaves the GPRS network, it is transferred to external TCP-IP network 336, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

GPRS network 330 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not received pages from a circuit switched domain when engaged in a data call, since the MS is receiving data and is not listening to a paging channel In a NOM3 network, a MS can monitor pages for a circuit switched network while received data and vise versa.

IP multimedia network 338 was introduced with 3GPP Release 5, and includes IP multimedia subsystem (IMS) 340 to provide rich multimedia services to end users. A representative set of the network entities within IMS 340 are a call/session control function (CSCF), media gateway control function (MGCF) 346, media gateway (MGW) 348, and a master subscriber database, referred to as a home subscriber server (HSS) 350. HSS 350 may be common to GSM network 301, GPRS network 330 as well as IP multimedia network 338. IP multimedia system 340 is built around the call/session control function, of which there are three types: interrogating CSCF (I-CSCF) 343, proxy CSCF (P-CSCF) 342 and serving CSCF (S-CSCF) 344. P-CSCF 342 is the MS's first point of contact with IMS 340. P-CSCF 342 forwards session initiation protocol (SIP) messages received from the MS to an SIP server in a home network (and vice versa) of the MS. P-CSCF 342 may also modify an outgoing request according to a set of rules defined by the network operator (for example, address analysis and potential modification).

I-CSCF 343 forms an entrance to a home network and hides the inner topology of the home network from other networks and provides flexibility for selecting an S-CSCF. I-CSCF 343 may contact subscriber location function (SLF) 345 to determine which HSS 350 to use for the particular subscriber, if multiple HSSs 350 are present. S-CSCF 344 performs the session control services for MS 302. This includes routing originating sessions to external networks and routing terminating sessions to visited networks. S-CSCF 344 also decides whether application server (AS) 352 is required to receive information on an incoming SIP session request to ensure appropriate service handling. This decision is based on information received from HSS 350 (or other sources, such as application server 352). AS 352 also communicates to location server 356 (e.g., a Gateway Mobile Location Center (GMLC)) that provides a position (e.g., latitude/longitude coordinates) of MS 302.

HSS 350 contains a subscriber profile and keeps track of which core network node is currently handling the subscriber. It also supports subscriber authentication and authorization functions (AAA). In networks with more than one HSS 350, a subscriber location function provides information on HSS 350 that contains the profile of a given subscriber.

The MGCF 346 provides interworking functionality between SIP session control signaling from IMS 340 and ISUP/BICC call control signaling from the external GSTN networks (not shown). It also controls media gateway (MGW) 348 that provides user-plane interworking functionality (e.g., converting between AMR- and PCM-coded voice). MGW 348 also communicates with other IP multimedia networks 354.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, may not indicate the actual physical location of the mobile phones outside the pre-defined area.

While the various embodiments have been described in connection with the preferred embodiments of the various figures, it is to be understood that other similar embodiments may be used or modifications and additions may be made to the described embodiment for performing the same function of the various embodiments without deviating therefrom. Therefore, the embodiments should not be limited to any single embodiment, but rather should be construed in breadth and scope in accordance with the appended claims.

What is claimed:

1. A server comprising:
   a processor; and
   memory coupled to the processor, the memory comprising executable instructions that when executed by the processor cause the processor to effectuate operations comprising:
   receiving a message from a decoy subscriber number, the decoy subscriber number comprising a phone number of a previously active account, wherein:
      the previously active account is not presently assigned to a subscriber;
      the previously active account is to be re-assigned to a subscriber after a predetermined period of time; and
      the previously active account comprises at least one of a transferred account, a cancelled account, or an unassigned account;
   comparing information in the received message to rules stored in a spam library, wherein the rules comprise determining whether a message is spam based at least in part on an age of the decoy subscriber number;
   flagging the received message as spam and providing the flagged message to a spam filtering service when information in the message received from the decoy subscriber number corresponds to the rules stored in the spam library; and
   providing the message received at the decoy subscriber number to a network provider when, based on the comparing, the message is not spam.

2. The server of claim 1, the operations further comprising:
   receiving a message from an active subscriber number;
   comparing information in the message from an active subscriber number to one or more rules stored in a spam library;
   flagging the message from an active subscriber number as spam when information in the received message corresponds to the rules stored in the spam library; and
   providing the flagged message to a spam filtering service.

3. The server of claim 1, wherein the message comprises at least one of:
   an electronic message;
   an instant message;
   a video message;
   a text message;
   a multimedia message;
   a picture; or
   a graphic.

4. The server of claim 1, wherein the rules comprise at least one of:
   a threshold limit of messages from a sender;
   prior use of a subscriber;
   one or more keywords indicating spam;
   sender identification; or
   information received from messages at other decoy subscriber numbers.

5. The server of claim 1, the operations further comprising:
   creating a message fingerprint based on the message received at the decoy subscriber number for identifying a new message as spam when, based on the determination, the message received at the decoy subscriber number is spam.

6. The server of claim 1, the operations further comprising:
   creating a message fingerprint based on the message received at the decoy subscriber number for identifying a new message as being solicited by a subscriber when, based on the determination, the message received at the decoy subscriber number is not spam.

7. The server of claim 1, wherein whether the message received at the decoy subscriber number is spam is determined based on the duration for which the previously active account has been inactive.

8. A method comprising:
   receiving a message from a decoy subscriber number, the decoy subscriber number comprising a phone number of a previously active account, wherein:
      the previously active account is not presently assigned to a subscriber;
      the previously active account is to be re-assigned to a subscriber after a predetermined period of time; and
      the previously active account comprises at least one of a transferred account, a cancelled account, or an unassigned account;
   comparing, by a processor, information in the received message to rules stored in a spam library, wherein the rules comprise determining whether a message is spam based at least in part on an age of the decoy subscriber number; and
   flagging the received message as spam and providing the flagged message to a spam filtering service when information in the message received from the decoy subscriber number corresponds to the rules stored in the spam library.

9. The method of claim 8, further comprising:
   receiving a message from an active subscriber number;
   comparing information in the message from an active subscriber number to one or more rules stored in a spam library;

flagging the message from an active subscriber number as spam when information in the received message corresponds to the rules stored in the spam library; and providing the flagged message to the spam filtering service.

10. The method of claim 8, wherein the message comprises at least one of:
an electronic message;
an instant message;
a video message;
a text message;
a multimedia message;
a picture; or
a graphic.

11. The method of claim 8, wherein the rules comprise at least one of:
a threshold limit of messages from a sender;
prior use of a subscriber;
one or more keywords indicating spam;
sender identification; or
information received from messages at other decoy subscriber numbers.

12. The method of claim 8, further comprising:
creating a message fingerprint based on the message received at the decoy subscriber number for identifying a new message as spam when, based on the determination, the message received at the decoy subscriber number is spam.

13. The method of claim 8, further comprising:
creating a message fingerprint based on the message received at the decoy subscriber number for identifying a new message as being solicited by a subscriber when, based on the determination, the message received at the decoy subscriber number is not spam.

14. The method of claim 8, wherein whether the message received at the decoy subscriber number is spam is determined based on the duration for which the previously active account has been inactive.

15. A computer-readable storage medium that is not a propagating signal, the computer-readable storage medium comprising executable instructions that when executed by a processor cause the processor to effectuate operations comprising:
receiving a message from a decoy subscriber number, the decoy subscriber number comprising a phone number of a previously active account, wherein:
the previously active account is not presently assigned to a subscriber;
the previously active account is to be re-assigned to a subscriber after a predetermined period of time; and
the previously active account comprises at least one of a transferred account, a cancelled account, or an unassigned account;
comparing information in the received message to rules stored in a spam library, wherein the rules comprise determining whether a message is spam based at least in part on an age of the decoy subscriber number; and
flagging the received message as spam and providing the flagged message to a spam filtering service when information in the message received from the decoy subscriber number corresponds to the rules stored in the spam library.

16. The computer-readable storage medium of claim 15, the operations further comprising:
receiving a message from an active subscriber number;
comparing information in the message from an active subscriber number to one or more rules stored in a spam library;
flagging the message from an active subscriber number as spam when information in the received message corresponds to the rules stored in the spam library; and
providing the flagged message to the spam filtering service.

17. The computer-readable storage medium of claim 15, wherein:
the message comprises at least one of:
an electronic message;
an instant message;
a video message;
a text message;
a multimedia message;
a picture; or
a graphic; and
the rules comprise at least one of:
a threshold limit of messages from a sender;
prior use of a subscriber;
one or more keywords indicating spam;
sender identification; or
information received from messages at other decoy subscriber numbers.

18. The computer-readable storage medium of claim 15, the operations further comprising:
creating a message fingerprint based on the message received at the decoy subscriber number for identifying a new message as spam when, based on the determination, the message received at the decoy subscriber number is spam.

19. The computer-readable storage medium of claim 15, the operations further comprising:
creating a message fingerprint based on the message received at the decoy subscriber number for identifying a new message as being solicited by a subscriber when, based on the determination, the message received at the decoy subscriber number is not spam.

20. The computer-readable storage medium of claim 15, wherein whether the message received at the decoy subscriber number is spam is determined based on the duration for which the previously active account has been inactive.

* * * * *